United States Patent
Abe

(10) Patent No.: US 8,331,757 B2
(45) Date of Patent: Dec. 11, 2012

(54) TIME CODE PROCESSING APPARATUS, TIME CODE PROCESSING METHOD, PROGRAM, AND VIDEO SIGNAL PLAYBACK APPARATUS

(75) Inventor: Masae Abe, Tokyo (JP)

(73) Assignee: Sony Corporation, Tokyo (JP)

( * ) Notice: Subject to any disclaimer, the term of this patent is extended or adjusted under 35 U.S.C. 154(b) by 751 days.

(21) Appl. No.: 12/244,191

(22) Filed: Oct. 2, 2008

(65) Prior Publication Data

US 2009/0092383 A1    Apr. 9, 2009

(30) Foreign Application Priority Data

Oct. 3, 2007   (JP) ................. P2007-260080

(51) Int. Cl.
  *H04N 5/765* (2006.01)
  *H04N 9/80* (2006.01)

(52) U.S. Cl. .............. 386/232; 386/239; 386/248

(58) Field of Classification Search ............. 386/232, 386/239, 248
See application file for complete search history.

(56) References Cited

U.S. PATENT DOCUMENTS

| 7,212,733 B2 | 5/2007 | Yoshida et |
| 2004/0263682 A1* | 12/2004 | Shinkai ............... 348/441 |

FOREIGN PATENT DOCUMENTS

| JP | 2002-125192 | * 4/2002 |
| JP | 2003 289512 | 10/2003 |
| JP | 2004 312275 | 11/2004 |
| JP | 2005 20330 | 1/2005 |

* cited by examiner

*Primary Examiner* — Thai Tran
*Assistant Examiner* — Hung Dang
(74) *Attorney, Agent, or Firm* — Frommer Lawrence & Haug LLP; William S. Frommer; Thomas F. Presson

(57) ABSTRACT

Disclosed herein is a time code processing apparatus including a time code reading section configured to read each of the first time code values; a phase detection section configured to detect a phase in a sequence of the pulldown process; and a time code generation section configured to use the first time code value as the second time code value when both the phase detected by the phase detection section and the first time code value obtained by the time code reading section have changed, and generate the second time code value while performing an interpolation based on the first time code value when at least one of the phase detected by the phase detection section and the first time code value obtained by the time code reading section has not changed.

10 Claims, 10 Drawing Sheets

FIG. 5 ANOTHER STRUCTURE OF VIDEO SIGNAL PLAYBACK APPARATUS

TIME CODE GENERATION OPERATION IN CASE WHERE SWITCH BETWEEEN NORMAL PLAYBACK AND SLOW PLAYBACK IS ALLOWED

2:3 PULLDOWN

2:3:3:2 PULLDOWN

TRACK FORMAT

SIGNAL RECORDING IMAGE

TIME CODE

TIME CODE PROCESSING APPARATUS, TIME CODE PROCESSING METHOD, PROGRAM, AND VIDEO SIGNAL PLAYBACK APPARATUS

CROSS REFERENCES TO RELATED APPLICATIONS

The present invention contains subject matter related to Japanese Patent Application JP 2007-260080 filed in the Japan Patent Office on Oct. 3, 2007, the entire contents of which being incorporated herein by reference.

BACKGROUND OF THE INVENTION

1. Field of the Invention

The present invention relates to a time code processing apparatus, a time code processing method, a program, and a video signal playback apparatus. In particular, the present invention relates to a technique of, when playing back a first video signal in 24 frame/s progressive format as a second video signal in 30 frame/s interlaced format, generating second time code values for the second video signal based on first time code values that are provided in the first video signal at intervals of a given number of frames.

2. Description of the Related Art

Movie films and so on are commonly shot at 24 frames per second. In order to allow video taken with a video camera, instead of a film camera, to be displayed in a manner similar to that in which video recorded on a film is displayed, a video signal in 24 frame/s progressive format (hereinafter referred to as a "24p video signal") is commonly generated. Meanwhile, in television devices, video is commonly displayed using a video signal in 30 frame/s interlaced format (hereinafter referred to as a "60i video signal"). As such, 2:3 pulldown, 2:3:3:2 pulldown, and so on are commonly performed to convert the 24p video signal to the 60i video signal.

Referring to FIG. 9, in the 2:3 pulldown, two fields of 60i video signal are generated from a first frame of the 24p video signal. Three fields of 60i video signal are generated from a second frame of the 24p video signal. Two fields of 60i video signal are generated from a third frame of the 24p video signal. Three fields of 60i video signal are generated from a fourth frame of the 24p video signal. In this manner, five frames of 60i video signal are generated from four frames of 24p video signal. This process corresponds to one sequence. This sequence is repeated to convert the 24p video signal to the 60i video signal. Note that, in FIG. 9 and FIG. 10 described below, "t" and "b" in the 60i video signal represent a top field and a bottom field, respectively.

Referring to FIG. 10, in the 2:3:3:2 pulldown, two fields of 60i video signal are generated from the first frame of the 24p video signal. Three fields of 60i video signal are generated from the second frame of the 24p video signal. Three fields of 60i video signal are generated from the third frame of the 24p video signal. Two fields of 60i video signal are generated from the fourth frame of the 24p video signal. This process corresponds to one sequence. This sequence is repeated to convert the 24p video signal to the 60i video signal. In the case where the 2:3:3:2 pulldown is applied, conversion of the 60i video signal to the 24p video signal is easily accomplished by, in each sequence, eliminating the third frame of the 60i video signal and recovering each two-field signal to a one-frame signal.

Further, in order to facilitate edition and the like, time code values are provided so as to be associated with the video signals. When converting the 24p video signal to the 60i video signal, it is necessary to generate time code values for the 60i video signal based on time code values for the 24p video signal. As such, Japanese Patent Laid-Open No. 2003-289512 and U.S. Pat. No. 7,212,733 corresponding thereto, for example, disclose a technique of converting the time code values for the 24p video signal to the time code values for the 60i video signal at the time of normal playback or varied-speed playback.

SUMMARY OF THE INVENTION

In the 24p video signal used in the technique as disclosed in Japanese Patent Laid-Open No. 2003-289512, time code values are continuously assigned to each frame of continuous video, and this technique is effective when it is possible to acquire these time code values sequentially. Thus, in the case where it is not possible to acquire the time code value of each frame, it may be impossible to generate continuous time code values for the 60i video signal.

Here, an exemplary case will be described where continuous time code values are not obtained with respect to each frame of continuous video. The HDV standard, which is applied when compressing a high-definition (HD) signal in accordance with the MPEG-2 (Moving Picture Experts Group phase 2) system and recording the compressed HD signal on, for example, a DV video tape, specifies that time code values should be recorded at intervals of three frames when recording the 60i video signal.

FIG. 11 shows a track pattern in the HDV standard. FIG. 12 shows a signal recording image. A track includes an Insert and Track Information (ITI) sector, a main sector, and a subcode sector. The ITI sector is an area in which a reference signal, information concerning the track, and so on are recorded. The main sector is an area in which the signal compressed in accordance with the MPEG-2 system is recorded. The subcode sector is an area in which data for high-speed search, an absolute track number necessary for tape management, and so on are recorded. Although not shown, gaps are prepared between the sectors. Thus, even if a signal for a certain sector is displaced from its proper recording position, no signals in the other sectors are damaged.

As shown in FIG. 12, in the main sector are recorded: encoded video signals MI of I pictures, i.e., intraframe predicted images; encoded video signals MP of P pictures, i.e., forward interframe predicted images; encoded video signals MB of B pictures, i.e., bidirectional interframe predicted images; encoded audio signals MA; audio auxiliary data Ja; video auxiliary data Jv; and error detection and correction signals ECC, each of which is prepared for a certain number of tracks.

Here, three frames of encoded video signal constitute one pack unit. A time code value of one of the frames included in each pack unit which has a presentation time stamp (PTS) at its top is recorded in the video auxiliary data Jv, and an interpolation is performed using this time code value to determine time code values of the other two frames. Note that information for decoding the encoded video signal, e.g., the PTS, and so on is also recorded in the video auxiliary data Jv.

In the HDV standard, pulldown may be performed when recording the 24p video signal. If the pulldown is performed, the number of frames increases. Accordingly, time code values are provided in the 24p video signal at intervals of three frames while some time code values are selectively eliminated so as to accommodate the 60i video signal.

FIG. 13 shows a time code when the 24p video signal is recorded. Four frames of 24p video signal correspond to five frames of 60i video signal. Therefore, some frames in the 24p video signal do not coincide in phase with any frame in the 60i video signal. Accordingly, the time code values are set in the 24p video signal such that those frames in the 24p video signal which coincide in phase with a frame in the 60i video signal are assigned with the same time code value as that assigned to their corresponding frame in the 60i video signal.

For example, frames in the 60i video signal that are assigned with time code values "10," "15," and "20" coincide in phase with frames in the 24p video signal. Accordingly, those corresponding frames in the 24p video signal are assigned with the time code values "10," "15," and "20." Meanwhile, the other frames in the 24p video signal, which do not coincide in phase with any frame in the 60i video signal, are assigned with time code values that increase in a stepwise manner, starting with that of the frame which coincides in phase with a frame in the 60i video signal. Thus, the time code values in the 24p video signal are: "6," "7," "8," "10," "11," "12," "13," "15," "16," "17," "18," and "20." Note here that some time code values, i.e., "9," "14," and "19," have been selectively eliminated. Because the standard specifies that the time code value of one of the frames in each pack unit which has the PTS at its top should be recorded in the video auxiliary data Jv, values "6," "10," "13," and "17" are recorded, as time code values TCw, in the video auxiliary data Jv.

When the 24p video signal is played back, an inverse of the process at the time of the recording is performed to convert the 60i video signal to the 24p video signal, and the resulting 24p video signal is outputted as a reproduced signal. In the reproduced signal, the video auxiliary data Jv represents the time code value of one of the frames in each pack unit of the 24p video signal which has the PTS at its top.

As described above, in the 24p video signal, discontinuous time code values are set at intervals of a given number of frames, and therefore, the technique as disclosed in Japanese Patent Laid-Open No. 2003-289512 is incapable of generating continuous time code values for the 60i video signal.

The embodiments of the present invention addresses the above-identified, and other problems associated with existing methods and apparatuses, and makes it possible to generate continuous time code values for a video signal in 30 frame/s interlaced format, even when time code values are set in a video signal in 24 frame/s progressive format at intervals of a given number of frames while some time code values are selectively eliminated so as to accommodate the video signal in the 30 frame/s interlaced format.

A concept of the embodiments of the present invention lies in, when converting a first video signal in 24 frame/s progressive format, in which time code values are set at intervals of a given number of frames while some time code values are selectively eliminated, to a second video signal in 30 frame/s interlaced format, generating second time code values while performing an interpolation based on the time code values in the first video signal, thereby obtaining continuous time code values for the second video signal.

According to one embodiment of the present invention, there is provided a time code processing apparatus that, when a first video signal in 24 frame/s progressive format is subjected to a pulldown process to be converted to a second video signal in 30 frame/s interlaced format, generates second time code values for the second video signal based on first time code values that are provided in the first video signal at intervals of a given number of frames while some time code values are selectively eliminated so as to accommodate the second video signal. The apparatus including: a time code reading section configured to read each of the first time code values; a phase detection section configured to detect a phase in a sequence of the pulldown process; and a time code generation section configured to use the first time code value as the second time code value when both the phase detected by the phase detection section and the first time code value obtained by the time code reading section have changed, and generate the second time code value while performing an interpolation based on the first time code value when at least one of the phase detected by the phase detection section and the first time code value obtained by the time code reading section has not changed.

According to another embodiment of the present invention, there is provided a time code processing method of, when a first video signal in 24 frame/s progressive format is subjected to a pulldown process to be converted to a second video signal in 30 frame/s interlaced format, generating second time code values for the second video signal based on first time code values that are provided in the first video signal at intervals of a given number of frames while some time code values are selectively eliminated so as to accommodate the second video signal. The method including the steps of: reading each of the first time code values; detecting a phase in a sequence of the pulldown process; and using the first time code value as the second time code value when both the phase detected in the detecting and the first time code value obtained in the reading have changed, and generating the second time code value while performing an interpolation based on the first time code value when at least one of the phase detected in the detecting and the first time code value obtained by the reading has not changed.

According to yet another embodiment of the present invention, there is provided a program for causing a computer to execute a time code processing method of, when a first video signal in 24 frame/s progressive format is subjected to a pulldown process to be converted to a second video signal in 30 frame/s interlaced format, generating second time code values for the second video signal based on first time code values that are provided in the first video signal at intervals of a given number of frames while some time code values are selectively eliminated so as to accommodate the second video signal. The method including the steps of: reading each of the first time code values; detecting a phase in a sequence of the pulldown process; and using the first time code value as the second time code value when both the phase detected in the detecting and the first time code value obtained in the reading have changed, and generating the second time code value while performing an interpolation based on the first time code value when at least one of the phase detected in the detecting and the first time code value obtained by the reading has not changed.

According to yet another embodiment of the present invention, there is provided a video signal playback apparatus that subjects a first video signal in 24 frame/s progressive format to a pulldown process to convert the first video signal to a second video signal in 30 frame/s interlaced format, and plays back the second video signal. The apparatus including: a time code reading section configured to read each of first time code values that are provided in the first video signal at intervals of a given number of frames while some time code values are selectively eliminated so as to accommodate the second video signal; a phase detection section configured to detect a phase in a sequence of the pulldown process; and a time code generation section configured to use the first time code value as a second time code value when both the phase detected by the phase detection section and the first time code value obtained by the time code reading section have changed, and generate the second time code value while performing an interpolation based on the first time code value when at least one of the phase detected by the phase detection section and the first time code value obtained by the time code reading section has not changed, and output the second time code value so as to be synchronized with the second video signal.

According to one embodiment of the present invention, when both the detected phase and the read time code value have changed, the first time code value is used as the second time code value, whereas when at least one of the detected phase and the read time code value has not changed, an interpolation is performed using the first time code value to generate the second time code value. Thus, even when the time code values are set as the first time code values in the first video signal at intervals of a given number of frames while some time code values are selectively eliminated, it is possible to generate continuous second time code values for the second video signal.

DETAILED DESCRIPTION OF THE PREFERRED EMBODIMENTS

Figure 1:
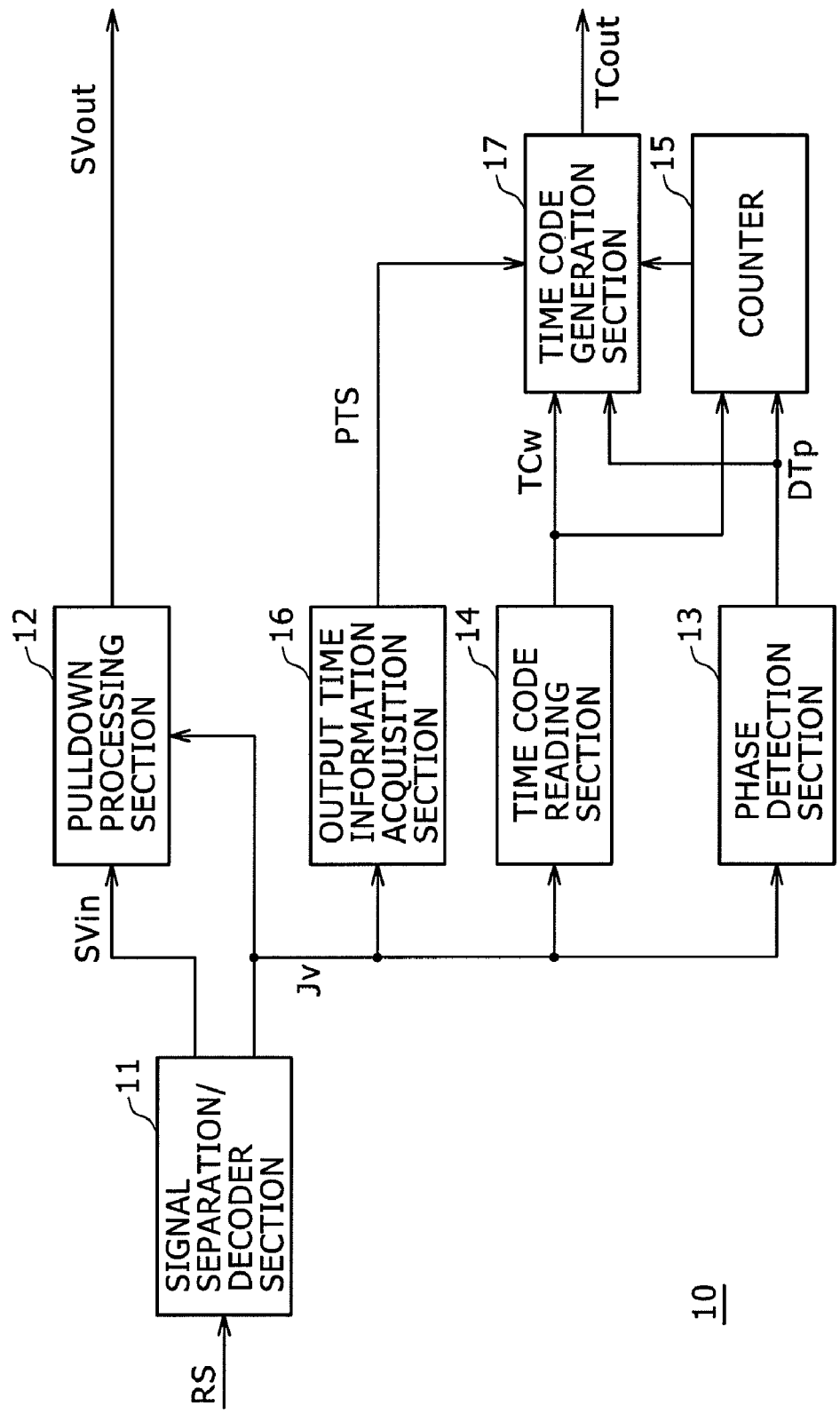
FIG. 1 shows the structure of a video signal playback apparatus.

Hereinafter, preferred embodiments of the embodiments of the present invention will be described with reference to the accompanying drawings. FIG. 1 shows the structure of a video signal playback apparatus 10.

Figure 11:
FIG. 11 illustrates a track format.
Figure 12:
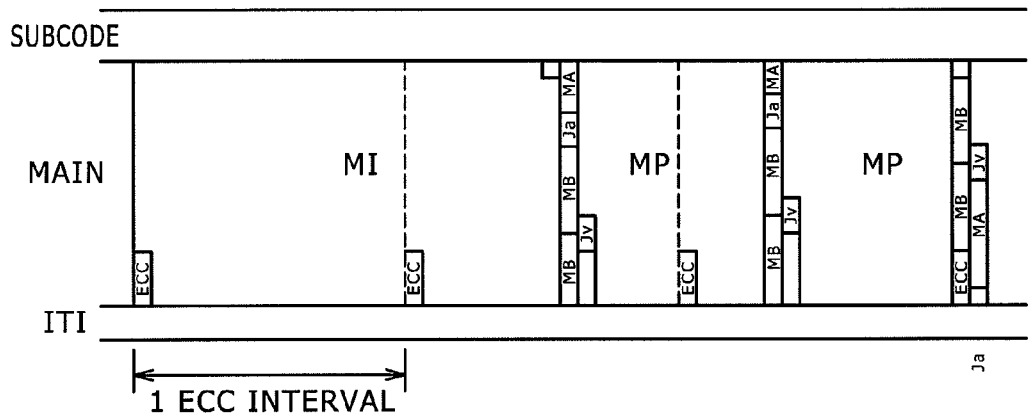
FIG. 12 illustrates a signal recording image.
Figure 13:
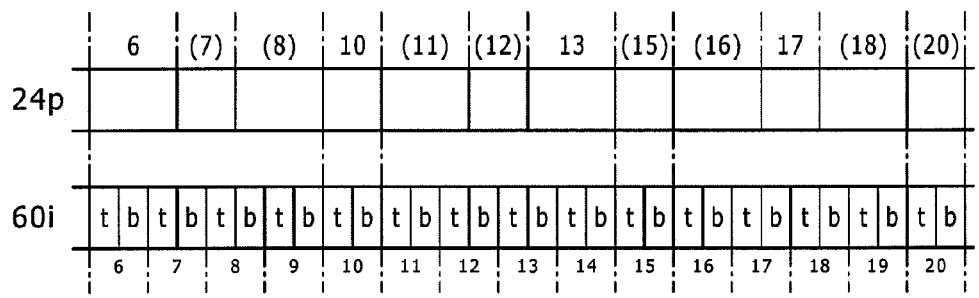
FIG. 13 illustrates a time code when a 24p video signal is recorded.

The video signal playback apparatus 10 supplies, to a signal separation/decoder section 11, a reproduced signal RS obtained by playing back a storage medium, e.g., a magnetic tape, on which signals are recorded in a manner as illustrated in FIG. 11, for example.

The signal separation/decoder section 11 separates, from the reproduced signal RS, an encoded video signal in a main sector, and decodes the encoded video signal. The signal separation/decoder section 11 supplies the resulting video signal SVin to a pulldown processing section 12. In addition, the signal separation/decoder section 11 separates, from the reproduced signal RS, video auxiliary data Jv in the main sector, and supplies the video auxiliary data Jv to the pulldown processing section 12, a phase detection section 13, a time code reading section 14, and an output time information acquisition section 16.

If the video auxiliary data Jv supplied from the signal separation/decoder section 11 indicates that the video signal SVin is in 24 frame/s progressive format, the pulldown processing section 12 subjects the video signal in the 24 frame/s progressive format (i.e., a 24p video signal) to a pulldown process, e.g., 2:3 pulldown or 2:3:3:2 pulldown, thereby converting the 24p video signal to a video signal in 30 frame/s interlaced format (i.e., a 60i video signal). The pulldown processing section 12 outputs the resulting 60i video signal obtained by the pulldown process as a video output signal SVout. Meanwhile, if the video auxiliary data Jv supplied from the signal separation/decoder section 11 indicates that the video signal SVin is in the 30 frame/s interlaced format, the pulldown processing section 12 outputs the supplied video signal as the video output signal SVout, without subjecting the supplied video signal to the pulldown process.

The phase detection section 13 acquires phase detection information DTp from the video auxiliary data Jv, and supplies the phase detection information DTp to a counter 15 and a time code generation section 17. The phase detection information DTp allows identification of a phase in a sequence of the pulldown process, i.e., which frame (i.e., a first, second, third, or fourth frame) of the 24p video signal is being used in a sequence of generating five frames of 60i video signal from four frames of 24p video signal.

The time code reading section 14 reads a time code value TCw included in the video auxiliary data Jv, and supplies the time code value TCw to the counter 15 and the time code generation section 17.

When the phase detection information DTp and the time code value TCw have changed, the counter 15 sets, based on the phase detection information DTp, an initial value in accordance with the phase in the sequence of the pulldown process, and repeatedly performs a counting operation of counting to the number of frames of 60i video signal that are generated in one sequence, i.e., five, in synchronism with the frames of the video output signal Svout obtained by the pulldown process, and supplies a count value CT to the time code generation section 17.

The output time information acquisition section 16 acquires a presentation time stamp (PTS), i.e., information for managing a time of playback output, from the video auxiliary data Jv, and supplies the presentation time stamp (PTS), as output time information PT, to the time code generation section 17.

In the case where both the phase in the sequence of the pulldown process as indicated by the phase detection information DTp supplied from the phase detection section 13 and the time code value TCw obtained by the time code reading section 14 have changed, the time code generation section 17 uses the time code value TCw read by the time code reading section 14 as a time code value TCout for the 60i video output signal SVout obtained by the pulldown process. In the case where at least one of the phase in the sequence of the pulldown process as indicated by the phase detection information DTp supplied from the phase detection section 13 and the time code value TCw obtained by the time code reading section 14 has not changed, the time code generation section 17 generates the time code value TCout for the 60i video output signal SVout obtained by the pulldown process while performing an interpolation based on the time code value TCw and the output time information PT acquired by the output time information acquisition section 16, if the count value CT supplied from the counter 15 is not a specified value. Meanwhile, if the count value CT supplied from the counter 15 is the specified value, the time code generation section 17 adds "1" to the time code value TCout of an immediately previous frame and uses the resulting value as the time code value TCout of a current frame. The specified value is a value that indicates a timing of a frame in the 60i video signal whose corresponding time code value is not present in the 24p video signal.

Next, a time code generation operation performed by the video signal playback apparatus 10 will now be described below with reference to a flowchart of FIG. 2.

At step ST1, the time code reading section 14 acquires the time code value TCw. The time code reading section 14 acquires the time code value TCw from the video auxiliary data Jv, and supplies the acquired time code value TCw to the time code generation section 17. Then, control proceeds to step ST2.

At step ST2, the phase detection section 13 acquires the phase detection information DTp. The phase detection section 13 extracts flags Ftf and Frf from the video auxiliary data Jv, and supplies the extracted flags Ftf and Frf to the counter 15 and the time code generation section 17 as the phase detection information DTp. Then, control proceeds to step ST3. The flags Ftf and Frf indicate the phase in the sequence of the pulldown process. The flag Ftf indicates whether a first field in a pack unit is a top field or a bottom field. The flag Frf indicates whether a field is repeated in a first picture in the pack unit.

At step ST3, the time code generation section 17 determines whether both the time code value TCw and the phase detection information DTp have changed. If the time code generation section 17 determines that both the time code value TCw and the phase detection information DTp have changed, control proceeds to step ST4. If otherwise, control proceeds to step ST6.

At step ST4, the counter 15 starts the counting operation. The counter 15 sets the initial value based on the phase detection information DTp, and starts a quinary counting operation. Then, control proceeds to step ST5.

At step ST5, the time code generation section 17 outputs the acquired time code value TCw as the time code value TCout. Then, control proceeds to step ST10.

At step ST6, the time code generation section 17 determines whether the time code value TCw is the specified value. If the time code generation section 17 determines that the time code value TCw is the specified value, control proceeds to step ST7. Meanwhile, if the time code generation section 17 determines that the time code value TCw is not the specified value, control proceeds to step ST8.

At step ST7, the time code generation section 17 adds "1" to a time code value that has been outputted last time, i.e., the time code value of the immediately previous frame, and outputs the resulting value as the time code value TCout of the current frame. Then, control proceeds to step ST10.

At step ST8, the time code generation section 17 acquires the output time information PT. Then, control proceeds to step ST9.

At step ST9, the time code generation section 17 performs an interpolation and outputs an appropriate time code value. Specifically, based on the acquired output time information PT and the acquired time code value TCw, the time code generation section 17 identifies the number of frames between the frame corresponding to the acquired time code value TCw and the current frame based on an amount of time that has elapsed since the frame corresponding to the acquired time code value TCw, adds the identified number of frames to the acquired time code value TCw, thereby achieving the interpolation, and outputs the resulting value as the time code value TCout. Then, control proceeds to step ST10.

At step ST10, the phase detection section 13 increments the count value of the counter 15. Then, control returns to step ST1.

Next, a manner in which the time code values TCout are generated in the time code generation operation will now be described specifically below with reference to FIGS. 3A to 3J. FIGS. 3A to 3J illustrate a case where a period Wp of the 24p video signal is inserted between periods of the 60i video signal.

Figure 3:
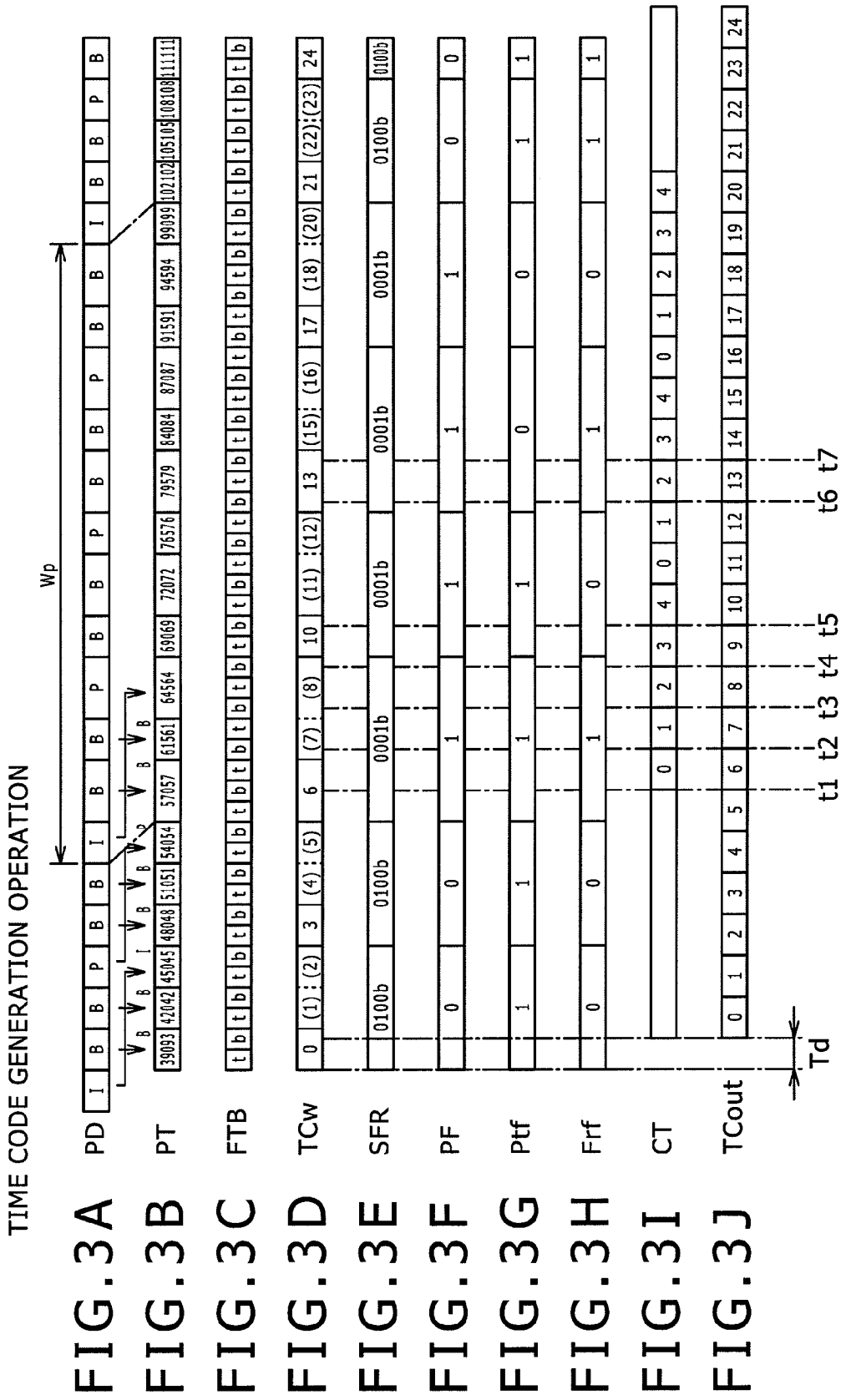
FIGS. 3A to 3J illustrate the time code generation operation.

FIG. 3A shows picture types PD of the encoded video signal. FIG. 3B shows the output time information PT. FIG. 3C shows field information FTB, which indicates whether each field is the top field, represented by "t," or the bottom field, represented by "b." Note that the 24p video signal has been subjected to the pulldown as described above and recorded as the 60i video signal. FIG. 3D shows the recorded time code values TCw. It is assumed here that the 2:3 pulldown has been performed.

FIG. 3E shows source frame rate information SFR, which indicates a period in which the 60i video signal is recorded or a period in which the 24p video signal is recorded. For example, "0100b" represents a frame rate of 30 frames per second, whereas "0001b" represents a frame rate of 24 frames per second. FIG. 3F shows scanning system information PF, which indicates a period in which an interlaced video signal is recorded or a period in which a progressive video signal is recorded. For example, "0" represents the interlaced system, whereas "1" represents the progressive system. FIGS. 3G and 3H show information that indicates the phase in the sequence. FIG. 3G shows the flag Ftf, which indicates whether the first field in the pack unit is the top field or the bottom field. FIG. 3H shows the flag Frf, which indicates whether a field is repeated in the first picture in the pack unit.

FIG. 3I shows the count value CT of the counter 15. FIG. 3J shows the time code values TCout outputted from the time code generation section 17. It is assumed here that the counting operation of the counter 15 involves a delay Td relative to the time code value TCw, the flags Ftf and Frf, and other information, because of the determination concerning the change in the time code value TCw and the phase detection information DTp, the setting of the initial value based on the phase detection information DTp, and so on. The 60i video output signal SVout is outputted with the delay Td so as to be synchronized with the time code values TCout.

For each sequence of the 2:3 pulldown, where field signals are generated from each frame of the 24p video signal, the following four phases are repeated: "top field, bottom field, top field," "bottom field, top field," "bottom field, top field, bottom field," and "top field, bottom field." Thus, the current phase is identifiable based on the flags Ftf and Frf as shown in FIGS. 3G and 3H. Therefore, the flags Ftf and Frf are used as the phase detection information DTp.

The video auxiliary data Jv includes the pieces of information as shown in FIGS. 3B and 3D to 3H, and this video auxiliary data Jv is used to generate the time code values TCout for the 60i video signal obtained by the pulldown process.

Figure 2:
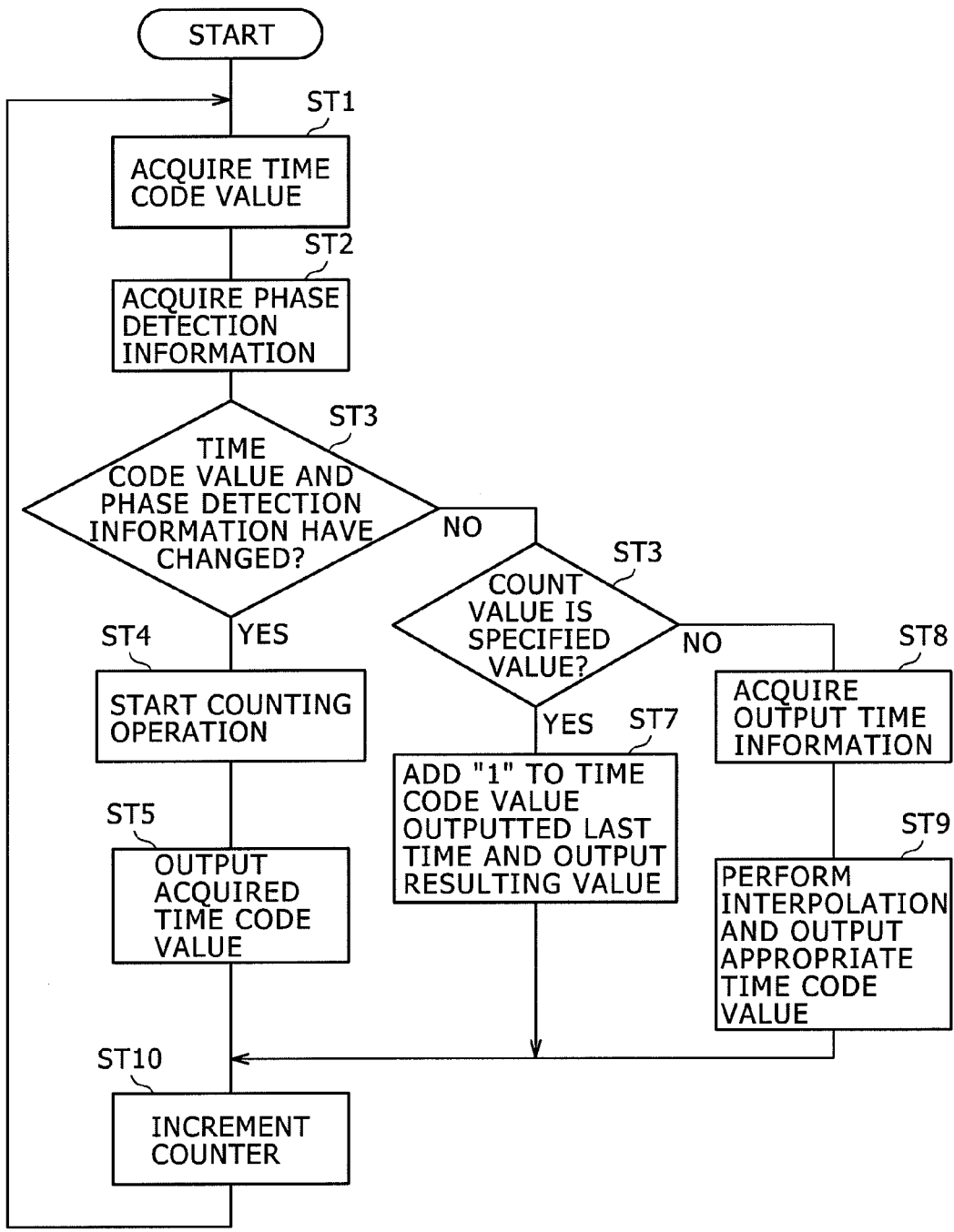
FIG. 2 is a flowchart illustrating a time code generation operation.

Suppose here that the time code generation operation as shown in FIG. 2 is performed. At time point t1, both the time code value TCw and the phase detection information DTp have changed, and therefore, the initial value of the counter 15 is set based on the phase detection information DTp, and the counting operation is performed. Note here that when both the flags Ftf and Frf indicate "1," the initial value to be set is "0;" that when the flags Ftf and Frf indicate "1" and "0," respectively, the initial value to be set is "4;" that when the flags Ftf and Frf indicate "0" and "1," respectively, the initial value to be set is "2;" and that when both the flags Ftf and Frf indicate "0," the initial value to be set is "1." In addition, the recorded time code value TCw, "6," is outputted from the time code generation section 17 as the time code value TCout.

At time points t2 and t3, the time code value TCw has not changed and the count value CT is not the specified value, "3," the interpolation is performed based on the acquired output time information PT and the acquired time code value TCw, and "7" and "8" are outputted as the time code values TCout for the frames of time points t2 and t3, respectively.

At time point t4, the time code value TCw has not changed and the count value CT has reached the specified value "3." Therefore, "1" is added to the time code value TCout of the immediately previous frame, and the resulting value "9" is outputted as the time code value TCout.

At time point t5, as at time point t1, the initial value of the counter 15 is set based on the phase detection information DTp, and the counting operation is performed. Because the flags Ftf and Frf now indicate "1" and "0," respectively, the initial value is set to "4" as described above. In addition, the recorded time code value TCw, "10," is outputted as the time code value TCout.

At time point t6, as at time points t1 and t5, the initial value of the counter 15 is set based on the phase detection information DTp, and the counting operation is performed. Because the flags Ftf and Frf now indicate "0" and "1," respectively, the initial value is set to "2" as described above. In addition, the recorded time code value TCw, "13," is outputted from the time code generation section 17 as the time code value TCout.

At time point t7, the time code value TCw has not changed, and the count value CT has reached the specified value "3." Therefore, "1" is added to the time code value TCout of the immediately previous frame, and the resulting value "14" is outputted as the time code value TCout.

Similar processes are repeated thereafter. Thus, even when the time code values are provided in the 24p video signal at intervals of three frames while some time code values are selectively eliminated so as to accommodate the 60i video signal, it is possible to set continuous time code values in each frame of the 60i video signal obtained by subjecting the 24p video signal to the pulldown process.

Thus, in a device (e.g., an editing device) that receives a signal composed of the 60i video output signal and the time code values superimposed thereon and processes the received signal while making much of continuity in the time code values, it is possible to set continuous time code values TCout in each frame of the 60i video output signal SVout, resulting in improved convenience. Specifically, HD-SDI (High Definition-Serial Digital Interface), SD-SDI (Standard Definition-Serial Digital Interface), IEEE 1394, and other devices that are equipped with a combination of an analog input and a time code input or the like, such as a component and a composite, are capable of receiving both the images and the time code values. Thus, the technique according to the present embodiment is effective when performing an edition with such devices.

In the case where the 24p video signal is played back at a slower speed than a normal speed or in the case where the 24p video signal is played back in a frame-by-frame manner (hereinafter simply referred to as "in the case where slow playback is performed"), the time code generation operation as shown in FIG. 2 would change the time code value even when a frame advance has not occurred. As such, a time code generation operation will now be described below which generates the time code values properly even in the case where the slow playback is performed.

Figure 4:
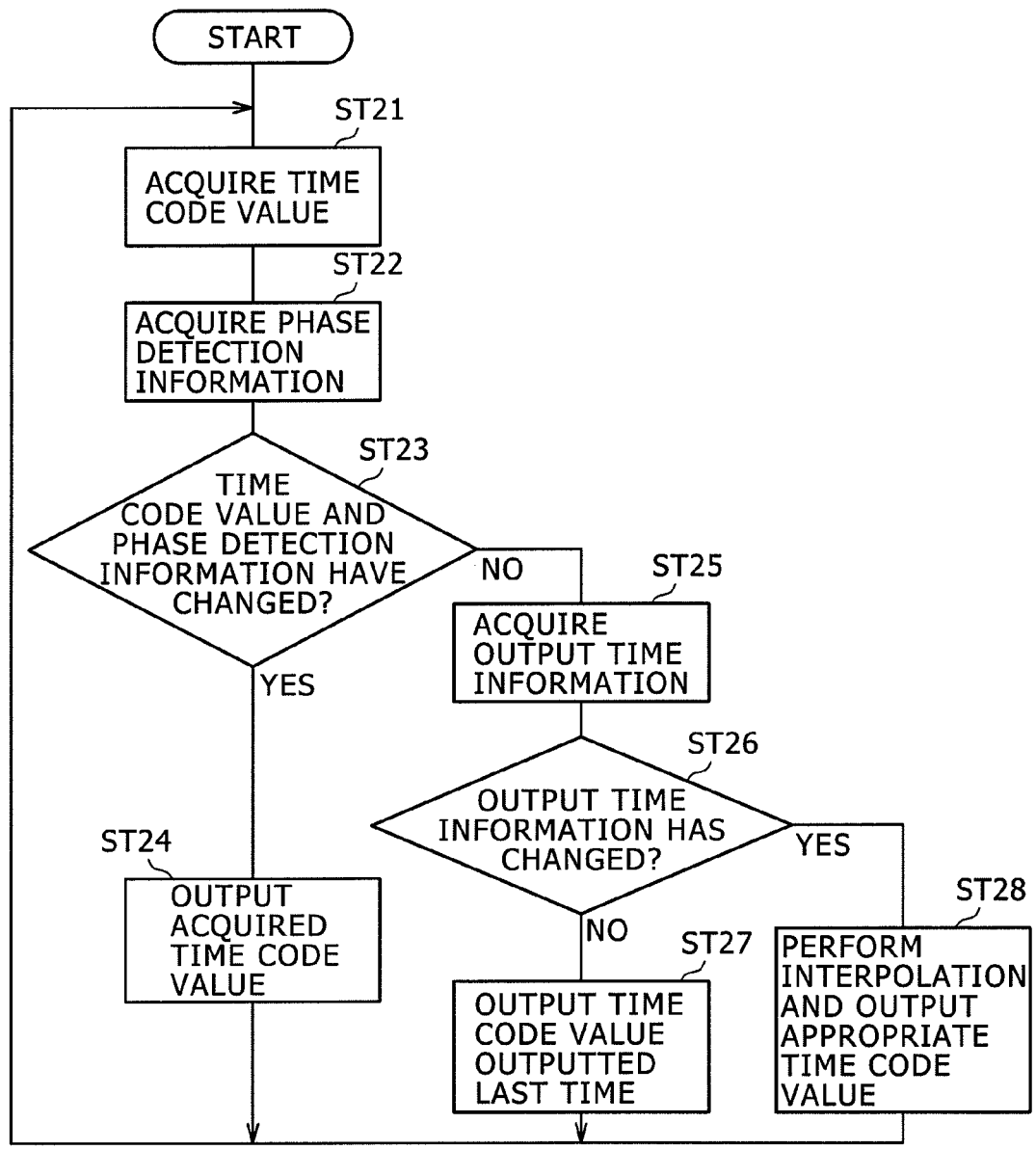
FIG. 4 is a flowchart illustrating a time code generation operation at the time of slow playback.

FIG. 4 is a flowchart illustrating a time code generation operation in the case where the slow playback is performed.

At step ST21, the time code reading section 14 acquires the time code value TCw. The time code reading section 14 acquires the time code value TCw from the video auxiliary data Jv, and supplies the acquired time code value TCw to the time code generation section 17. Then, control proceeds to step ST22.

At step ST22, the phase detection section 13 acquires the phase detection information DTp. The phase detection section 13 extracts the flags Ftf and Frf from the video auxiliary data Jv, and supplies the extracted flags Ftf and Frf, as the phase detection information DTp, to the counter 15 and the time code generation section 17. Then, control proceeds to step ST23.

At step ST23, the time code generation section 17 determines whether both the time code value TCw and the phase detection information DTp have changed. If the time code generation section 17 determines that both the time code value TCw and the phase detection information DTp have changed, control proceeds to step ST24. If otherwise, control proceeds to step ST25.

At step ST24, the time code generation section 17 outputs the acquired time code value TCw as the time code value TCout. Then, control returns to step ST21.

At step ST25, the time code generation section 17 acquires the output time information PT. Then, control proceeds to step ST26.

At step ST26, the time code generation section 17 determines whether the acquired output time information PT has changed relative to the output time information acquired last time. If the time code generation section 17 determines that the acquired output time information PT has not changed, control proceeds to step ST27. Meanwhile, if the time code generation section 17 determines that the acquired output time information PT has changed, control proceeds to step ST28.

At step ST27, the time code generation section 17 outputs the time code value TCout outputted last time again. Then, control returns to step ST21.

At step ST28, as at step ST9, the time code generation section 17 performs an interpolation and outputs an appropriate time code value. Specifically, based on the acquired output time information PT and the acquired time code value TCw, the time code generation section 17 identifies the number of frames between the frame corresponding to the acquired time code value TCw and the current frame based on the amount of time that has elapsed since the frame corresponding to the acquired time code value TCw, adds the identified number of frames to the acquired time code value TCw, thereby achieving the interpolation, and outputs the resulting value as the time code value TCout. Then, control returns to step ST21.

According to the above-described operation, the time code value does not change when no frame advance has occurred because of the slow playback, and the time code values TCout can be outputted properly.

Time code generation operations that are applicable at the time of the slow playback are not limited to the time code generation operation as shown in FIG. 4. For example, the time code generation operation may be performed using images in place of the output time information PT.

Figure 5:
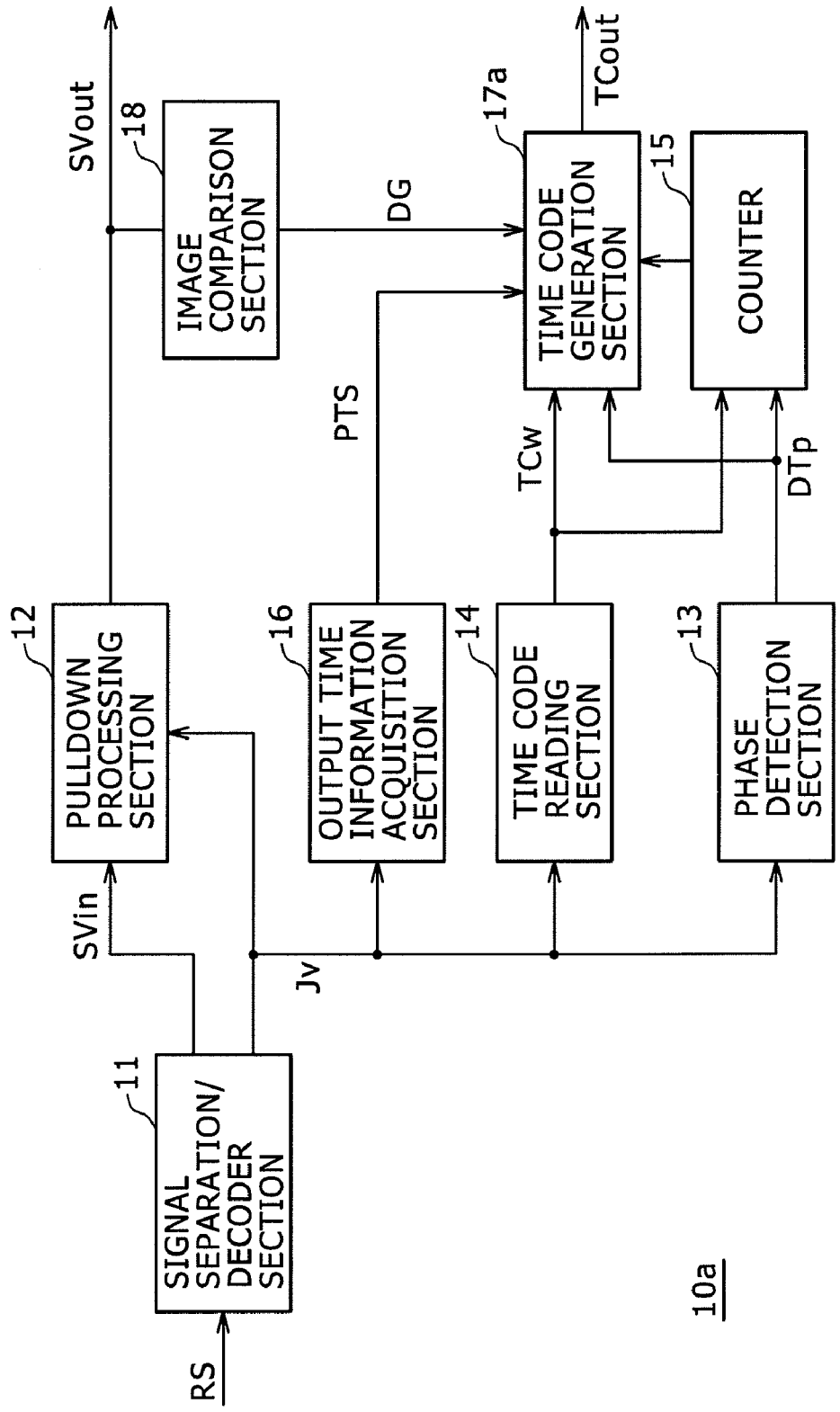
FIG. 5 shows another structure of the video signal playback apparatus.

FIG. 5 shows the structure of a video signal playback apparatus 10a according to another embodiment of the present invention, which performs the time code generation operation using the images at the time of the slow playback. Note that in FIG. 5, parts that have their counterparts in FIG.

1 are assigned the same reference characters as those of their counterparts, and that detailed descriptions thereof will be omitted.

In the video signal playback apparatus 10a, an image comparison section 18 uses the video output signal outputted from the pulldown processing section 12 and the video output signal of the immediately previous frame, as outputted from the pulldown processing section 12 previously, to determine whether their corresponding images coincide with each other. The image comparison section 18 supplies a comparison result signal DG, which indicates a result of that determination, to a time code generation section 17a.

When a specified phase has been detected by the phase detection section 13, the time code generation section 17a uses the time code value TCw read by the time code reading section 14 as the time code value TCout for the 60i video output signal SVout obtained by the pulldown process. Also, the time code generation section 17a generates the time code value TCout for the 60i video output signal SVout obtained by the pulldown process, by performing an interpolation based on the comparison result signal DG and the time code value TCw used when the specified phase has been detected by the phase detection section 13.

Since the time code generation section 17a generates the time code value TCout based on the comparison result signal DG, the video output signal SVout is outputted from the pulldown processing section 12 after a delay caused by a delay section (not shown), so that the video output signal SVout will be synchronized with the time code value TCout outputted from the time code generation section 17a.

Figure 6:
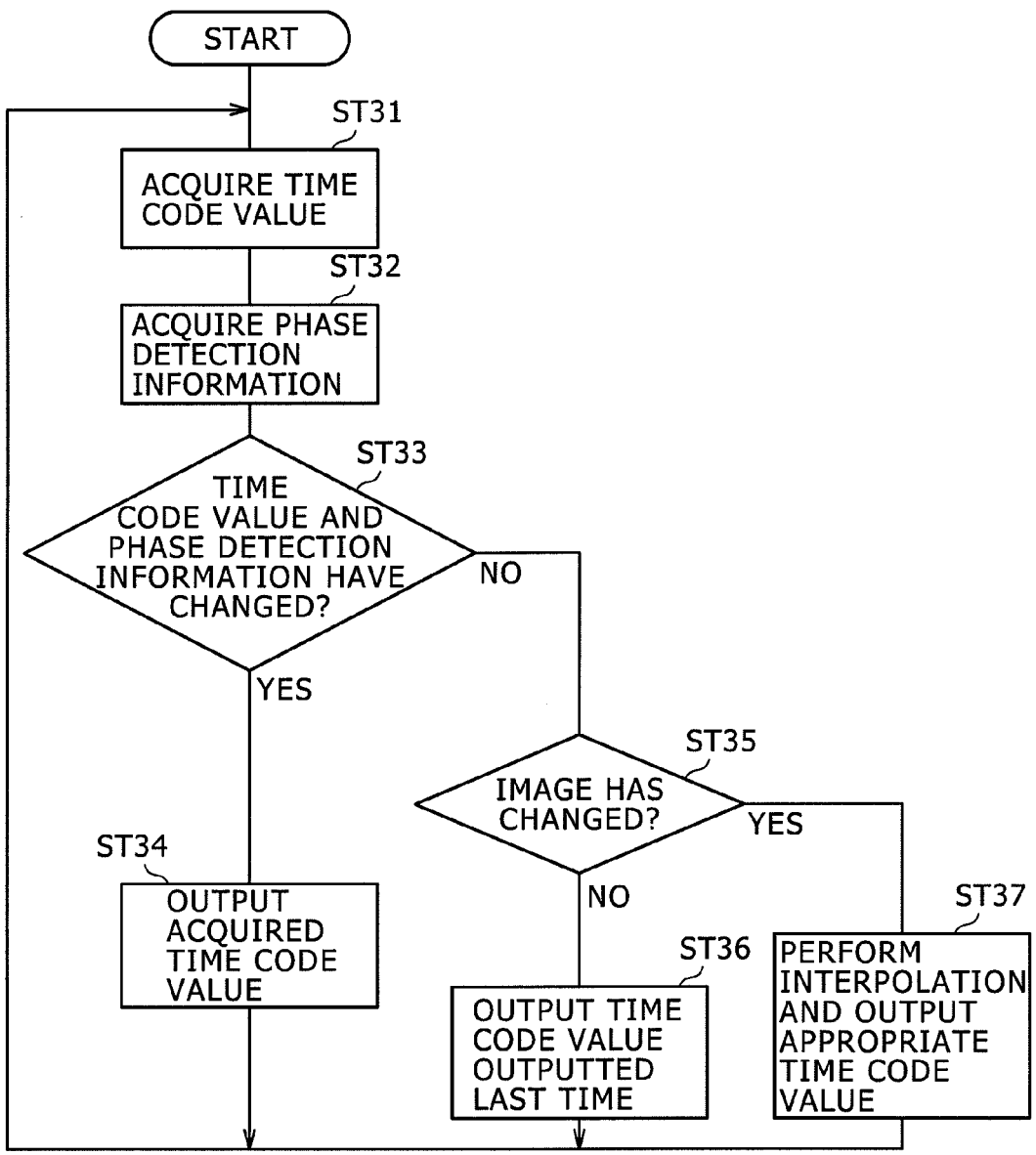
FIG. 6 is a flowchart illustrating another time code generation operation at the time of the slow playback.

FIG. 6 shows a flowchart illustrating another time code generation operation at the time of the slow playback, where the images are used when generating the time code value TCout.

At step ST31, the time code reading section 14 acquires the time code value TCw. The time code reading section 14 acquires the time code value TCw from the video auxiliary data Jv, and supplies the acquired time code value TCw to the time code generation section 17a. Then, control proceeds to step ST32.

At step ST32, the phase detection section 13 acquires the phase detection information DTp. The phase detection section 13 extracts the flags Ftf and Frf from the video auxiliary data Jv, and supplies the extracted flags Ftf and Frf, as the phase detection information DTp, to the counter 15 and the time code generation section 17a. Then, control proceeds to step ST33.

At step ST33, the time code generation section 17a determines whether both the time code value TCw and the phase detection information DTp have changed. If the time code generation section 17a determines that both the time code value TCw and the phase detection information DTp have changed, control proceeds to step ST34. If otherwise, control proceeds to step ST35.

At step ST34, the time code generation section 17a outputs the acquired time code value TCw as the time code value TCout. Then, control returns to step ST31.

At step ST35, the time code generation section 17a determines whether the image has changed, based on the comparison result signal DG supplied from the image comparison section 18. If the time code generation section 17a determines that an image to be outputted is not different from an image of the immediately previous frame, control proceeds to step ST36. Meanwhile, if the time code generation section 17a determines that the image to be outputted is different from the image of the immediately previous frame, control proceeds to step ST37.

At step ST36, the time code generation section 17a outputs the time code value TCout outputted last time again. Then, control returns to step ST31.

At step ST37, the time code generation section 17a performs an interpolation and outputs an appropriate time code value. The time code generation section 17a generates the time code value TCout by an interpolation using the time code value TCw. For example, the time code generation section 17a adds "1" to the time code value TCout of the immediately previous frame, and outputs the resulting value as the time code value TCout of the current frame. Then, control returns to step ST31.

According to the above-described operation, the time code value does not change when no frame advance, i.e., no change in image, has occurred because of the slow playback, and the time code values TCout can be outputted properly.

Further, the time code generation operations that are applicable at the time of the slow playback are not limited to the operations using the output time information PT or the images as shown in FIGS. 4 and 6. For example, the time code generation operation may be performed without using the output time information PT or the images.

Figure 7:
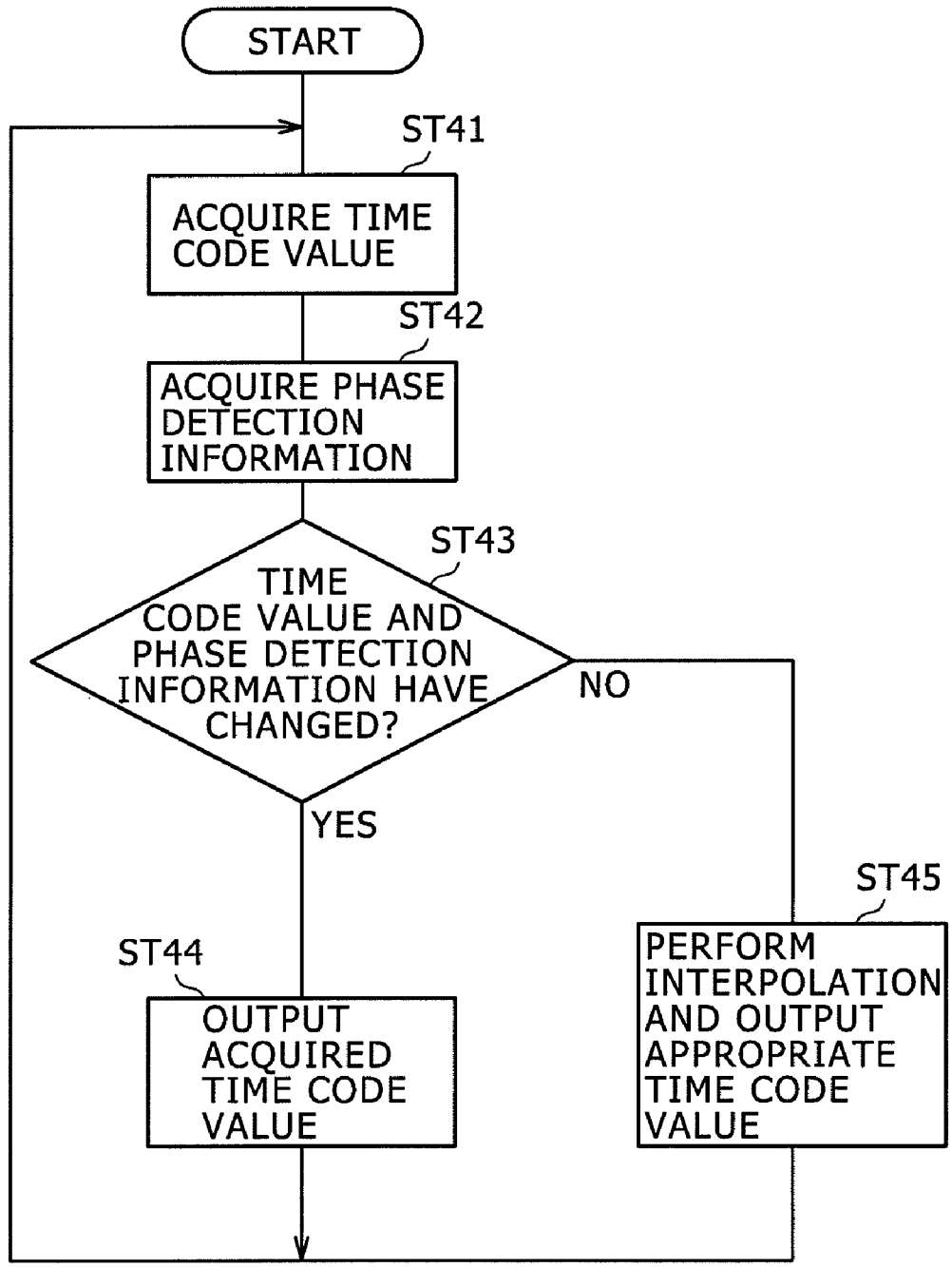
FIG. 7 is a flowchart illustrating still another time code generation operation at the time of the slow playback.

FIG. 7 shows a flowchart illustrating still another time code generation operation at the time of the slow playback, where the time code values are generated without using the output time information PT or the images.

At step ST41, the time code reading section 14 acquires the time code value TCw. The time code reading section 14 acquires the time code value TCw from the video auxiliary data Jv, and supplies the acquired time code value TCw to the time code generation section 17. Then, control proceeds to step ST42.

At step ST42, the phase detection section 13 acquires the phase detection information DTp. The phase detection section 13 extracts the flags Ftf and Frf from the video auxiliary data Jv, and supplies the extracted flags Ftf and Frf, as the phase detection information DTp, to the counter 15 and the time code generation section 17. Then, control proceeds to step ST43.

At step ST43, the time code generation section 17 determines whether both the time code value TCw and the phase detection information DTp have changed. If the time code generation section 17 determines that both the time code value TCw and the phase detection information DTp have changed, control proceeds to step ST44. If otherwise, control proceeds to step ST45.

At step ST44, the time code generation section 17 outputs the acquired time code value TCw as the time code value TCout. Then, control returns to step ST41.

At step ST45, the time code generation section 17 performs an interpolation and outputs an appropriate time code value as at step ST37. Then, control returns to step ST41.

According to the above-described operation, without use of the output time information PT, the time code value does not change when no frame advance has occurred because of the slow playback, and the time code values TCout can be outputted properly.

Figure 8:
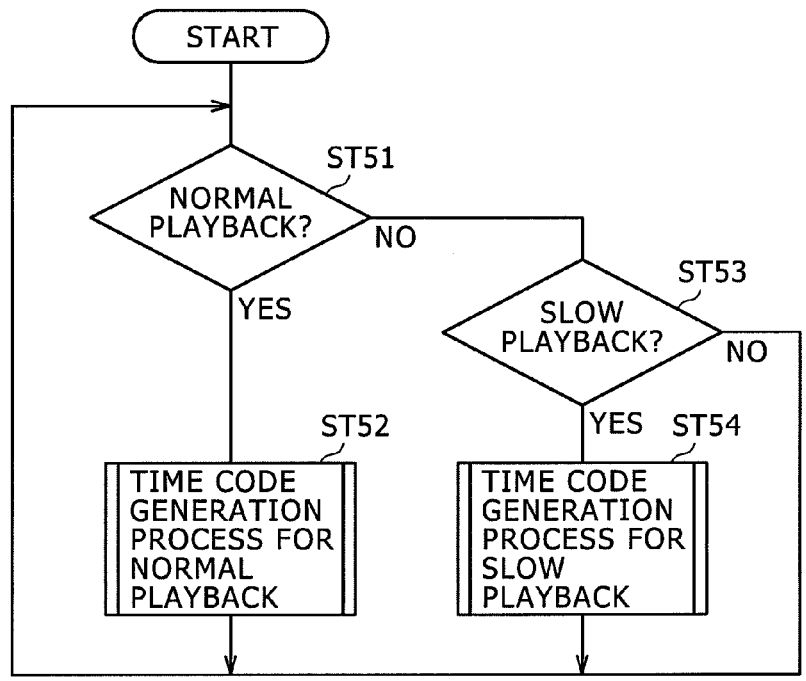
FIG. 8 is a flowchart illustrating a time code generation operation in the case where switch between normal playback and the slow playback is allowed.
Figure 9:
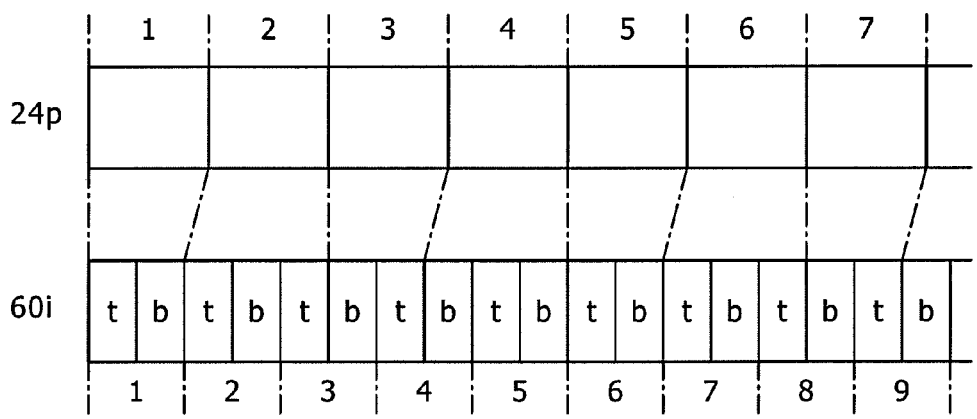
FIG. 9 illustrates 2:3 pulldown.
Figure 10:
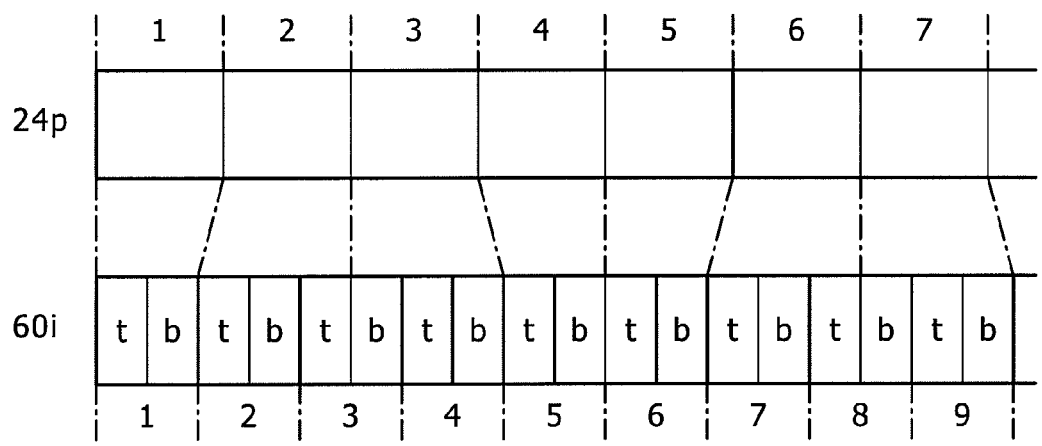
FIG. 10 illustrates 2:3:3:2 pulldown.

Still further, switch between normal playback and the slow playback may be allowed. FIG. 8 is a flowchart illustrating a time code generation operation in the case where the switch between the normal playback and the slow playback is allowed.

At step ST51, the time code generation section 17 determines whether the playback is at the normal speed. If the time code generation section 17 determines that the playback is at the normal speed, control proceeds to step ST52. Meanwhile, if the time code generation section 17 determines that the playback is not at the normal speed, control proceeds to step ST53.

At step ST52, the time code generation section 17 performs a time code generation process for the normal playback. In the time code generation process for the normal playback, processes of steps ST1 to ST10 as shown in FIG. 2 described above are performed, and after the generation and output of the time code value TCout, control returns from step ST10 to step ST51.

At step ST53, the time code generation section 17 determines whether the playback is at a reduced speed. If the time code generation section 17 determines that the playback is at a reduced speed, control proceeds to step ST54. Meanwhile, if the time code generation section 17 determines that the playback is not at a reduced speed, control returns to step ST51.

At step ST54, the time code generation section 17 performs a time code generation process for the slow playback. In the time code generation process for the slow playback, processes of steps ST21 to ST28 as shown in FIG. 4 described above are performed, and after the generation and output of the time code value TCout, control returns from step ST24, ST27, or ST28 to step ST51.

According to the above-described operation, even when the switch between the normal playback and the slow playback is allowed, it is possible to generate and output the time code values TCout easily and properly. Note that the time code generation operation as shown in FIG. 6 or the time code generation operation as shown in FIG. 7 may be performed as the time code generation process for the slow playback.

It should be understood by those skilled in the art that various modifications, combinations, sub-combinations and alterations may occur depending on design requirements and other factor in so far as they are within the scope of the appended claims or the equivalents thereof.

What is claimed is:

1. A time code processing apparatus that, when a first video signal in 24 frame/s progressive format is subjected to a pulldown process to be converted to a second video signal in 30 frame/s interlaced format, generates second time code values for the second video signal based on first time code values that are provided in the first video signal at intervals of a given number of frames while some time code values are selectively eliminated so as to accommodate the second video signal, the apparatus comprising:
a time code reading section configured to read each of the first time code values;
a phase detection section configured to detect a phase in a sequence of the pulldown process; and
a time code generation section configured to use the first time code value as the second time code value when both the phase detected by said phase detection section and the first time code value obtained by said time code reading section have changed, and generate the second time code value while performing an interpolation based on the first time code value when at least one of the phase detected by said phase detection section and the first time code value obtained by said time code reading section has not changed, thereby generating continuous time code values for said video signal in 30 frame/s interlaced format when time code values are set in said video signal in 24 frame/s progressive format at intervals of a given number of frames, and one or more time code values are selectively eliminated so as to accommodate the video signal in the 30 frame/s interlaced format, wherein the time code value does not change when no frame advance has occurred because of a slow playback, wherein slow playback is when the 24p video signal is played back at a slower speed than a normal speed.

2. The time code processing apparatus according to claim 1, further comprising:
a counter configured to repeatedly perform a counting operation of counting to the number of frames in the sequence at a frame rate of the second video signal, while setting an initial value in accordance with the phase detected by said phase detection section, wherein
when at least one of the phase detected by said phase detection section and the first time code value obtained by said time code reading section has not changed, said time code generation section generates the second time code value while performing the interpolation based on the first time code value if a count value of said counter is not a specified value, and adds "1" to the second time code value of an immediately previous frame and uses the resulting value as the second time code value if the count value has reached the specified value, the specified value being a value that indicates a timing of a frame whose corresponding time code value is not present in the first video signal.

3. The time code processing apparatus according to claim 1, further comprising:
an output time information acquisition section configured to acquire output time information concerning frames of the first video signal, wherein
said time code generation section identifies, based on the output time information, the number of frames between a current frame and a frame concerning which it has been determined that both the phase detected by said phase detection section and the first time code value obtained by said time code reading section have changed, and generates the second time code value based on the identified number of frames and the first time code value.

4. The time code processing apparatus according to claim 1, further comprising:
an output time information acquisition section configured to acquire output time information concerning frames of the first video signal, wherein
when at least one of the phase detected by said phase detection section and the first time code value obtained by said time code reading section has not changed, said time code generation section generates the second time code value while performing the interpolation based on the first time code value if the output time information has changed, and uses the second time code value of an immediately previous frame if the output time information has not changed.

5. The time code processing apparatus according to claim 1, wherein when at least one of the phase detected by said phase detection section and the first time code value obtained by said time code reading section has not changed, said time code generation section generates the second time code value while performing the interpolation based on the first time code value if an image has changed, and uses the second time code value of an immediately previous frame if the image has not changed.

6. A time code processing method of, when a first video signal in 24 frame/s progressive format is subjected to a pulldown process to be converted to a second video signal in 30 frame/s interlaced format, generating second time code values for the second video signal based on first time code values that are provided in the first video signal at intervals of a given number of frames while some time code values are selectively eliminated so as to accommodate the second video signal, the method comprising the steps of:

reading each of the first time code values;

detecting a phase in a sequence of the pulldown process; and using the first time code value as the second time code value when both the phase detected in said detecting and the first time code value obtained in said reading have changed, and generating the second time code value while performing an interpolation based on the first time code value when at least one of the phase detected in said detecting and the first time code value obtained by said reading has not changed, thereby generating continuous time code values for said video signal in 30 frame/s interlaced format when time code values are set in said video signal in 24 frame/s progressive format at intervals of a given number of frames, and one or more time code values are selectively eliminated so as to accommodate the video signal in the 30 frame/s interlaced format, wherein the time code value does not change when no frame advance has occurred because of a slow playback, wherein slow playback is when the 24p video signal is played back at a slower speed than a normal speed.

7. A non-transitory computer-readable medium storing a program for causing a computer to execute a time code processing method of, when a first video signal in 24 frame/s progressive format is subjected to a pulldown process to be converted to a second video signal in 30 frame/s interlaced format, generating second time code values for the second video signal based on first time code values that are provided in the first video signal at intervals of a given number of frames while some time code values are selectively eliminated so as to accommodate the second video signal, the method comprising the steps of:

reading each of the first time code values;

detecting a phase in a sequence of the pulldown process; and using the first time code value as the second time code value when both the phase detected in said detecting and the first time code value obtained in said reading have changed, and generating the second time code value while performing an interpolation based on the first time code value when at least one of the phase detected in said detecting and the first time code value obtained by said reading has not changed, thereby generating continuous time code values for said video signal in 30 frame/s interlaced format when time code values are set in said video signal in 24 frame/s progressive format at intervals of a given number of frames, and one or more time code values are selectively eliminated so as to accommodate the video signal in the 30 frame/s interlaced format, wherein the time code value does not change when no frame advance has occurred because of a slow playback, wherein slow playback is when the 24p video signal is played back at a slower speed than a normal speed.

8. A video signal playback apparatus that subjects a first video signal in 24 frame/s progressive format to a pulldown process to convert the first video signal to a second video signal in 30 frame/s interlaced format, and plays back the second video signal, the apparatus comprising:

a time code reading section configured to read each of first time code values that are provided in the first video signal at intervals of a given number of frames while some time code values are selectively eliminated so as to accommodate the second video signal;

a phase detection section configured to detect a phase in a sequence of the pulldown process; and a time code generation section configured to use the first time code value as a second time code value when both the phase detected by said phase detection section and the first time code value obtained by said time code reading section have changed, and generate the second time code value while performing an interpolation based on the first time code value when at least one of the phase detected by said phase detection section and the first time code value obtained by said time code reading section has not changed, and output the second time code value so as to be synchronized with the second video signal, thereby generating continuous time code values for said video signal in 30 frame/s interlaced format when time code values are set in said video signal in 24 frame/s progressive format at intervals of a given number of frames, and one or more time code values are selectively eliminated so as to accommodate the video signal in the 30 frame/s interlaced format, wherein the time code value does not change when no frame advance has occurred because of a slow playback, wherein slow playback is when the 24p video signal is played back at a slower speed than a normal speed.

9. A time code processing apparatus that, when a first video signal in 24 frame/s progressive format is subjected to a pulldown process to be converted to a second video signal in 30 frame/s interlaced format, generates second time code values for the second video signal based on first time code values that are provided in the first video signal at intervals of a given number of frames while some time code values are selectively eliminated so as to accommodate the second video signal, the apparatus comprising:

time code reading means for reading each of the first time code values;

phase detection means for detecting a phase in a sequence of the pulldown process; and time code generation means for using the first time code value as the second time code value when both the phase detected by said phase detection means and the first time code value obtained by said time code reading means have changed, and generating the second time code value while performing an interpolation based on the first time code value when at least one of the phase detected by said phase detection means and the first time code value obtained by said time code reading means has not changed, thereby generating continuous time code values for said video signal in 30 frame/s interlaced format when time code values are set in said video signal in 24 frame/s progressive format at intervals of a given number of frames, and one or more time code values are selectively eliminated so as to accommodate the video signal in the 30 frame/s interlaced format, wherein the time code value does not change when no frame advance has occurred because of a slow playback, wherein slow playback is when the 24p video signal is played back at a slower speed, than a normal speed.

10. A video signal playback apparatus that subjects a first video signal in 24 frame/s progressive format to a pulldown process to convert the first video signal to a second video signal in 30 frame/s interlaced format, and plays back the second video signal, the apparatus comprising:

time code reading means for reading each of first time code values that are provided in the first video signal at intervals of a given number of frames while some time code values are selectively eliminated so as to accommodate the second video signal;

phase detection means for detecting a phase in a sequence of the pulldown process; and time code generation means for using the first time code value as a second time code value when both the phase detected by said phase detection means and the first time code value obtained by said time code reading means have changed, and generating the second time code value while performing an interpolation based on the first time code value when at least one of the phase detected by said phase detection means and the first time code value obtained by said time code reading means has not changed, and outputting the second time code value so as to be synchronized with the second video signal, thereby generating continuous time code values for said video signal in 30 frame/s interlaced format when time code values are set in said video signal in 24 frame/s progressive format at intervals of a given number of frames, and one or more time code values are selectively eliminated so as to accommodate the video signal in the 30 frame/s interlaced format, wherein the time code value does not change when no frame advance has occurred because of a slow playback, wherein slow playback is when the 24p video signal is played back at a slower speed than a normal speed.

* * * * *